US008635205B1

(12) United States Patent
Kang et al.

(10) Patent No.: US 8,635,205 B1
(45) Date of Patent: Jan. 21, 2014

(54) DISPLAYING LOCAL SITE NAME INFORMATION WITH SEARCH RESULTS

(75) Inventors: Dongwon Kang, Seoul (KR); Geunhwi Lim, SungNam (KR)

(73) Assignee: Google Inc., Mountain View, CA (US)

( * ) Notice: Subject to any disclaimer, the term of this patent is extended or adjusted under 35 U.S.C. 154(b) by 381 days.

(21) Appl. No.: 12/818,631

(22) Filed: Jun. 18, 2010

(51) Int. Cl.
  *G06F 17/30* (2006.01)
(52) U.S. Cl.
  USPC .......................................... 707/711; 715/264
(58) Field of Classification Search
  USPC .................................... 707/769, 711; 715/264
  See application file for complete search history.

(56) References Cited

U.S. PATENT DOCUMENTS

| | | | | |
|---|---|---|---|---|
| 2003/0084034 | A1* | 5/2003 | Fannin | 707/3 |
| 2004/0194018 | A1* | 9/2004 | Abir | 715/501.1 |
| 2005/0240576 | A1* | 10/2005 | Piscitello et al. | 707/3 |
| 2007/0106653 | A1* | 5/2007 | Sun | 707/4 |
| 2009/0089278 | A1* | 4/2009 | Poola et al. | 707/5 |

* cited by examiner

Primary Examiner — Truong Vo
Assistant Examiner — Sabana Rahman
(74) Attorney, Agent, or Firm — Fish & Richardson P.C.

(57) ABSTRACT

The present disclosure involves systems, software, and computer-implemented methods for presenting local site name information associated with search results returned from a web search query. One process includes operations for receiving a search query request from a user and obtaining at least one search result responsive to the query, where the search result is associated with a uniform resource locator (URL). A local site name associated with at least a portion of the URL is retrieved for at least one of the obtained search results. Further, at least one search result is returned to the user via a search results page, where the at least one search result comprises the URL associated with the search result and the local site name associated therewith.

15 Claims, 7 Drawing Sheets

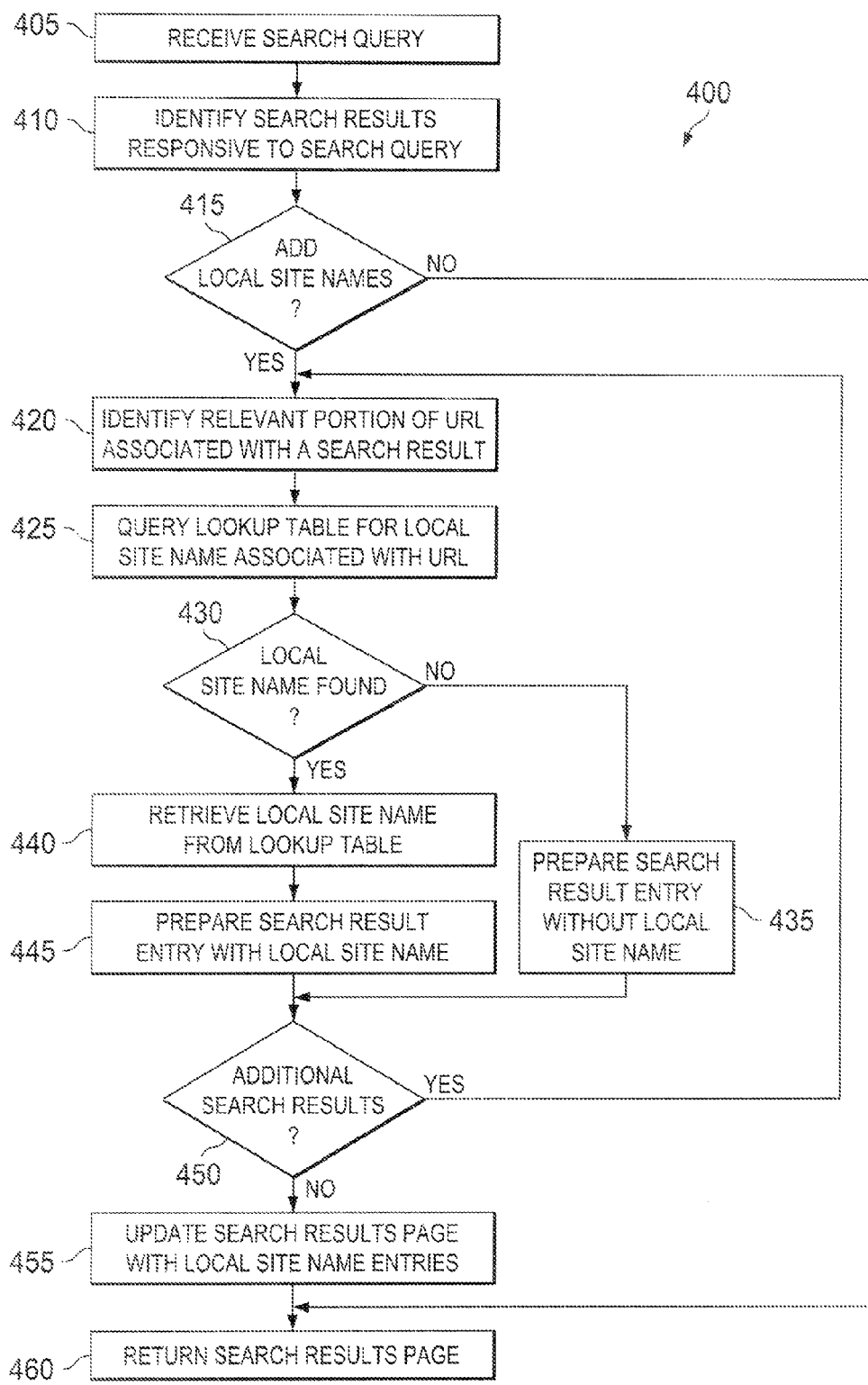

DISPLAYING LOCAL SITE NAME INFORMATION WITH SEARCH RESULTS

BACKGROUND

This specification relates to presenting local host names associated with search results received in response to a search engine query.

Search engines allow searching of the Internet for resources, examples of which include web pages, images, video, and audio content. A typical search engine provides a web page for entering search queries. A search query can be constructed from terms entered onto a web page by a user, and searches can be conducted for files that contain the terms identified in the search query. Results of a search conducted for a particular query can be ranked and listed on one or more search results web pages.

A basic search results web page may include a list of a particular search result title combined with a hyperlink to the associated web page, document, or other file returned in response to a search. In some instances, the search results may also include a uniform resource locator (URL) defining the location and source of the search result. In general, URLs are provided in Latin characters (i.e., a, b, c, etc.).

SUMMARY

In general, one aspect of the subject matter described in this specification can be embodied in methods that include the actions of i) receiving a search query, ii) obtaining at least one search result responsive to the search query, the at least one search result associated with a uniform resource locator (URL) and a page name, iii) retrieving a local site name associated with a host name portion of the URL for the at least one obtained search result, the host name portion being in a first language and the local site name being in a second language that differs from the first language, and iv) returning the at least one search result in a search results page, where the at least one search result includes the URL, page name, and local site name associated with the at least one search result.

These and other embodiments can each optionally include one or more of the following features, alone or in combination. For example, the second language can be determined based on one of a location of a client device that submits the search query or a language preference associated with the client device that submits the search query. The URL may include a Latin alphabet-based series of characters, where the local site name includes a representation of at least a portion of the URL in a non-Latin alphabet-based language. For example, the non-Latin alphabet-based language may be selected from the group consisting of Chinese, Japanese, Korean, and Arabic. In some embodiments, the local site name is retrieved from a local site name index. The local site name index may be populated using a click log. In one instance, populating the local site name index using a click log includes i) analyzing a set of search results associated with at least one search term received by a search engine, ii) generating a value of one or more metrics associated with the set of search results based on user interactions with the set of search results, iii) determining if the values of the one or more metrics associated with at least one of the set of search results exceeds a predetermined threshold criteria, and iv) associating at least a portion of the at least one search term with at least a portion of a URL associated with the at least one of the set of search results when the value of the one or more metrics associated with at least one of the set of search results exceed a predetermined threshold criteria. In other instances, the local site name index is populated by associating at least a portion of a URL with a particular local site name based on information retrieved from a directory service. The at least one search result returned to the user in the search results page may further include a text snippet associated with the at least one search result, and the local site name may be located adjacent to the URL associated with the at least one search result. Further, the page name may be in the first or second language.

Another aspect of the subject matter described in this specification can be embodied in an article comprising a computer readable storage medium, the computer readable storage medium storing instructions for causing one or more processors to perform operations including i) obtaining at least one search result responsive to a search query, the at least one search result associated with a URL and a page name, ii) retrieving a local site name associated with a host name portion of the URL for the at least one obtained search result, the host name portion being in a first language and the local site name being in a second language that differs from the first language, and iii) generating at least one search result for inclusion in a search results page, where the at least one search result includes the URL, page name, and local site name associated with the at least one search result.

These and other embodiments can each optionally include one or more of the following features, alone or in combination. For example, the second language may be determined based on one of a location of a client device that submits the search query or a language preference associated with the client device that submits the search query. The URL may include a Latin alphabet-based series of characters, and the local site name may include a representation of the host name portion of the URL in a non-Latin alphabet-based language. The non-Latin alphabet-based language may be selected from the group consisting of Chinese, Japanese, Korean, or Arabic. In some instances, the local site name is retrieved from a local site name index. The local site name index may be populated using a click log. Populating the local site name index may include i) analyzing a set of search results associated with at least one search term received by a search engine, ii) generating a value of one or more metrics associated with the set of search results based on user interactions with the set of search results, iii) determining if the values of the one or more metrics associated with at least one of the set of search results exceeds a predetermined threshold criteria, and iv) associating at least a portion of the at least one search term with at least a portion of a URL associated the at least one of the set of search results when the value of the one or more metrics associated with at least one of the set of search results exceed a predetermined threshold criteria. Alternatively, the local site name index may be populated by associating at least a portion of a URL with a particular local site name based on information retrieved from a directory service. The operations of the article and its instructions may further include the generated search results to a search engine for presenting a search results page to a client device, wherein the search results returned to the search engine server include the URL, page name, local site name, and a text snippet associated with each of the search results. Further, the local site name may be located adjacent to the URL associated with the at least one search result.

Another aspect of the subject matter described in this specification can be embodied in a system comprising one or more search engine servers adapted to generate search results associated with a particular search query, each search result associated with a uniform resource locator (URL) and a page name, one or more local site name servers adapted to retrieve a local site name associated with a host name portion of the URL for at least one of the search results, the host name portion of the URL being in a first language and the local site name being in a second language that differs from the first language, and one or more search results servers adapted to return at least one modified search results, where the modified search results include the URL, page name, and local site name associated with the at least one search result.

These and other embodiments can each optionally include one or more of the following features, alone or in combination. For example, the second language may be determined based on one of a location of a client device that submits the particular search query to the one or more search engine servers or a language preference associated with the client device that submits the search query to the one or more search engine servers. The one or more local site name servers may include a local site name index storing local site name information associated with a plurality of URLs. Further, the local site name index may be populated using a click log or by associating at least a portion of a URL with a particular local site name based on information retrieved from a directory service.

Particular embodiments of the subject matter described in this specification can be implemented so as to realize one or more of the following advantages. Searchers from non-English speaking countries can understand and/or translate the URL of a particular result to identify the source or web site associated with a search result's page title and text snippet. Searches are provided with an immediate identification of the source URL in the local language of the user, removing the need of the user to access the search result or rely on context-based determinations of the site or search result's origin.

The details of one or more embodiments of the present disclosure are set forth in the accompanying drawings and the description below. Other features of the present disclosure will be apparent from the description and drawings, and from the claims.

DESCRIPTION OF DRAWINGS

FIG. 4A is a flowchart illustrating a method for identifying, retrieving, and modifying search results to include one or more local site name entries with a list of search results.

DETAILED DESCRIPTION

Figure 1:
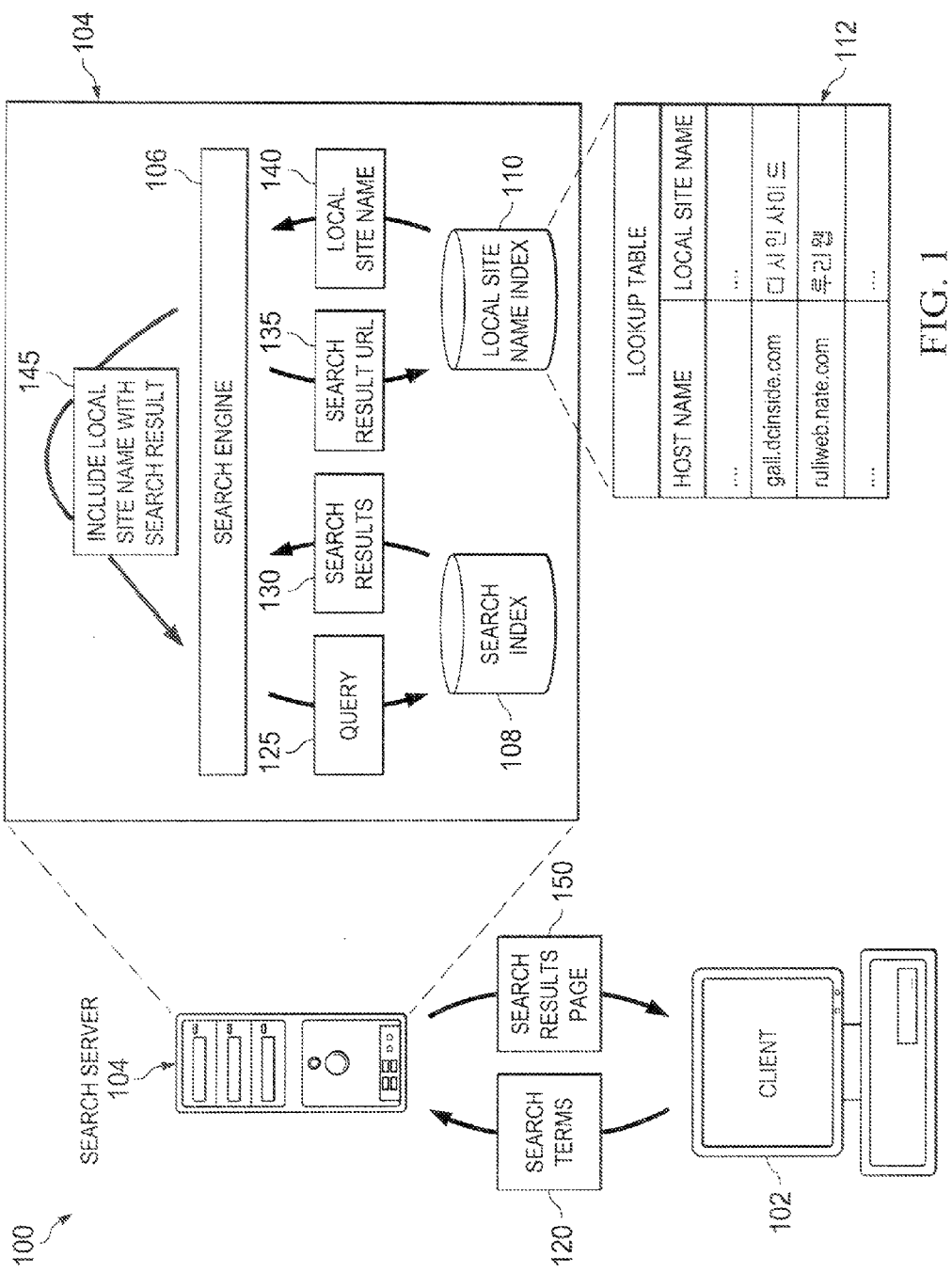
FIG. 1 is schematic diagram of a system for presenting local (or localized) site name information with search results identified by a search engine in a server-client environment.

According to techniques described in this specification, localized site information and site names of web pages and other documents are presented along with the results to one or more search queries from a search engine. Typical search engine interaction and result pages provide users with a listing of documents and web pages relevant to the search terms, along with hyperlinks to the web addresses associated with the results, with the listing organized according to ranking and/or sorting algorithms used by the particular search engine. Additionally, many search engines include portions of text from the individual results identified by the search (also known as "text snippets"), where the text snippets include or specifically relate to at least a portion of the search terms of interest. In many systems, search engine results present a page-specific title, a relevant text snippet associated with one or more search terms, and a Latin-character based (or ASCII-based) uniform resource locator (URL) defining the address at which a particular search result is located.

Many search engine users, however, are not familiar or fluent in English or other Latin-based character languages. For example, users in countries such as China, Japan, Korea, and numerous Arabic nations, among others, may not be able to precisely determine the local site name associated with a search result based upon the URL alone. Additionally, in some instances, returned search result listings may not provide any specific identity of the local site name with the search result, instead providing a page title (i.e., such as the name of the particular article on a web site), a text snippet from that particular page (i.e., a portion of the article including one or more of the search terms submitted with the initial query), and the specific URL. In non-English speaking locations, the search engine may provide both the page title and text snippet in the local language of the searcher, allowing those portions to be easily understood and recognized by the searcher. However, the URL, as defined by its standard, is limited to Latin-based characters defining the particular address. In other words, searchers from non-English speaking countries, and particularly searchers from countries using non-Latin based alphabets, may not be able to understand or translate the URL to identify the source or web site associated with the page title and text snippet. In those instances, providing a local site name written in the localized language of the searcher along with the URL provides a quick and immediate understanding of the search result's source without the searcher being required to access the link to determine the source himself.

While the described implementations focus on the provision of a local site name in a non-Latin-based alphabet, the present disclosure may be used to translate any URL or other portion of search results into a language other than that in which it is originally-provided. For example, an English language-based URL may be translated for the purposes of providing results to a German searcher, thus providing a German-based local site name along with the page title, text snippet, and URL to the searcher when interacting with the search engine. Still further, a non-English-based URL may also be translated into or provided with a local site name in English for sites with URLs spelled in language other than English, such as German, Spanish, Italian, or other languages capable of being adequately represented in the URL, but not directly understandable to the English-speaking user.

FIG. 1 is schematic diagram of a system 100 for presenting local (or localized) site name information with search results identified by a search engine in a server-client environment. Specifically, system 100 includes a client 102 and a search server 104. In general, system 100 allows users (or searchers) or client 102 to interface with a search engine 106 located at or associated with search server 104. Specifically, the searcher may send one or more search terms 120 to the search server 104 through a web-based interface or web site associated with the search engine 106, such that the search engine 106 reviews, or queries (125) one or more indexes (108) or repositories containing information associated with one or more web pages, documents, and other indexed or cataloged files that allow the search engine 106 to identify one or more search results 130 relevant to or associated with the search terms (120) provided by the searcher. In some instances, the search terms (120) may be manually typed-in searches entered by the searcher, while in other instances, the search terms (120) may be defined or selected by the searched based on one or more suggestions or alternative search terms returned by the search engine 106 in response to an initial set of submitted search terms (120).

Generally, each search result (130) returned from the search index or repository (108) and identified by the search engine 106 may include or be associated with several relevant items, including a page or document title, one or more portions of text from the identified search result, as well as a URL defining the particular location at which the search result may be located. In some instances, the search engine 106 may also have access to one or more cached versions of the search result, as well as one or more web pages or documents further associated with the search result.

Once the set of search results 130 are provided to the search engine 106, system 100 performs additional operations to retrieve further information to be provided with the search results when presented to the searcher. As illustrated herein, once the search results 130 are received by the search engine 106, each search result URL (or a portion thereof) is compared to a local site name index 110 to determine whether a local site name, or other additional identifier, is available to be included with the search result. For example, the illustrated local site name index 110 includes a lookup table 112 that associates a host name included in the search result URL 135 with a local site name. As illustrated in FIG. 1, the local site name is provided in corresponding Korean characters to provide Korean users with a Korean language-based site name associated with the URL of the search result URL 135. In one instance, a host name of "yahoo.com" may be associated with the Korean word that translates or is identified with the host name of "Yahoo." In addition to the other portions of the search results 130 provided to the search engine 106 from the query (125) to the search index 108, the local site name provides a clear indication of the host, web site, or other source of the search result when included with the search results. Therefore, searchers who do not understand the language in which the host name or URL associated with the search result is provided may be able to quickly and clearly understand the source or host of the search result without being required to activate or access the search result itself.

The search engine 106 receives a local site name 140 or other relevant identifier from the local site name index 110. The search engine 106 then includes or inserts the local site name into the relevant search result prior to presenting or returning the search results to the searcher (145). In some instances, the search engine 106 may temporarily store each of the local site names after retrieving them, and only include those local site names just prior to sending the search results page to the searcher. In other instances, the search engine 106 may update each search result entry as local site names are retrieved. Once each of the search results is associated with a local site name or no local site name is located, the search engine 106, via the search server 104, returns a search results page 150 to the client 102 and the searcher with information for each search result identifying that search result's page or document title, a relevant text snippet from the search result, a URL, and a local site name associated with the search result.

Figure 2:
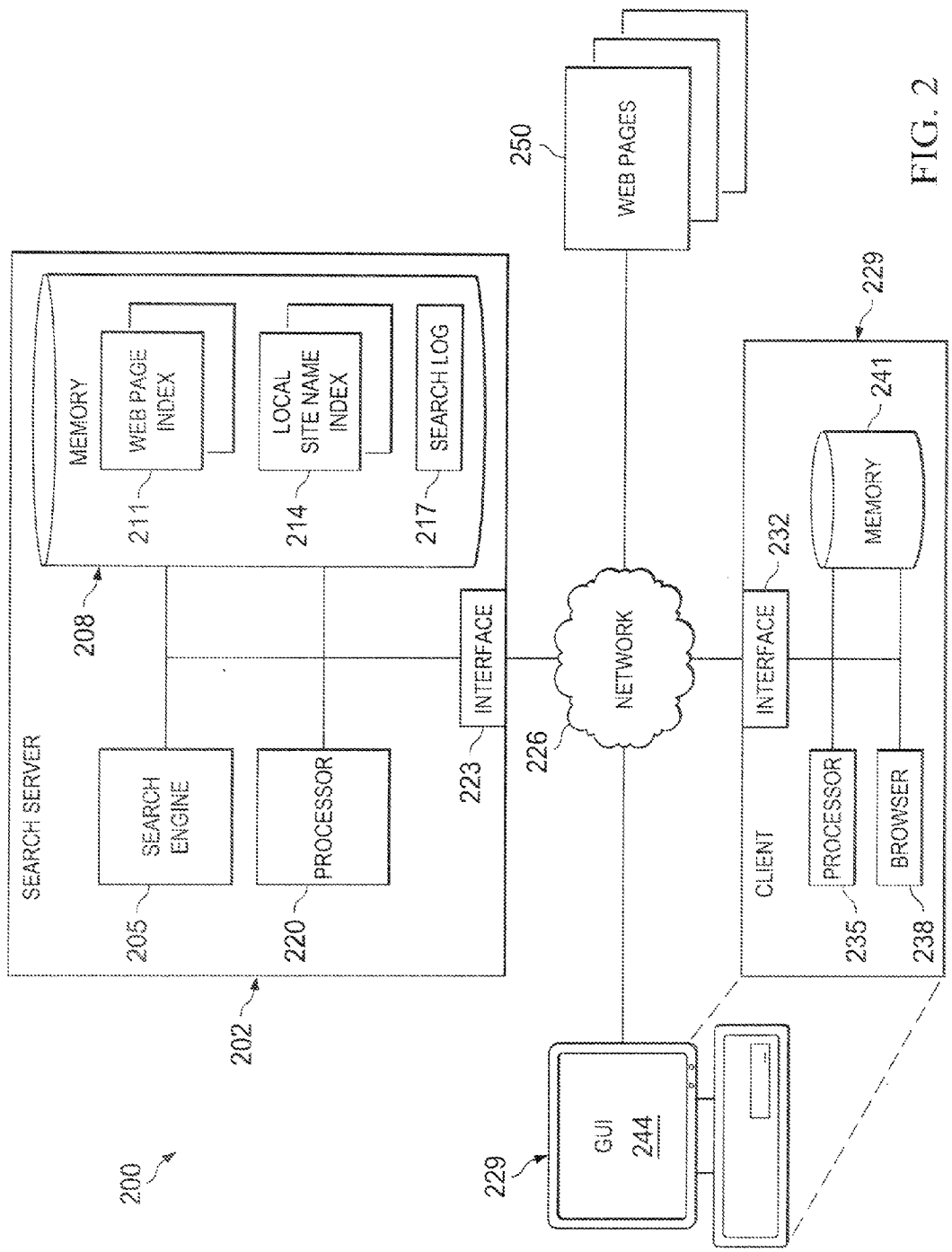
FIG. 2 is a block diagram illustrating a system for storing and presenting local site name information associated with relevant search results returned in response to a web search query.

FIG. 2 is a block diagram illustrating a system 200 for storing and presenting local site name information associated with relevant search results returned in response to a web search query. As shown, system 200 includes, or is communicably coupled with, a search server 202, a client 229, a network 226, and a plurality of web servers that store web pages 250. The client 229 is capable of sending, via the network 226, one or more search queries to the search engine 205 of the search server 202. In response to the query, the search server 202 (and particularly, its search engine 205), transmits at least one set of search query results, and for at least some of those results, a local site name entry, back to the client 229.

The search server 202 as illustrated includes a processor 220, a memory 208, an interface 223, and the search engine 205. In general, the search server 202 may be an electronic computer device operable to receive, transmit, process, store, or manage data associated with the system 200. The search server 202 of system 200 may be implemented using computers other than servers, as well as a server pool. Further, search server 202 may be adapted or operable to execute any operating system including Linux, UNIX, Windows, Mac OS X, or any other suitable operating system.

The search server 202 includes the processor 220. The processor 220 executes instructions and manipulates data to perform the operations of the search server 202, and may be implemented as, for example, a central processing unit (CPU), a blade, an application specific integrated circuit (ASIC), or a field-programmable gate array (FPGA), among others. Although illustrated as a single processor, multiple processors 220 may be used in some implementations. In FIG. 2, processor 220 executes the operations necessary to support the search engine 205. Specifically, the search engine 205 may be accessed via and/or across network 226 from multiple client devices (although only client 229 is illustrated in FIG. 2), each of which may be located locally or remotely from the search server 202. The search engine 205 may be accessed by the client device 229 and other devices to perform searches for web pages, documents, or other files available from the search server 202, as well as other servers (not shown) that are accessible through network 226, or through other networks or connections (not shown). In some implementations, the search engine 205 may be supported by multiple servers in, for example, a distributed server architecture.

In addition to performing searches, the search engine 205 (or another component related to, associated with, or embedded within the search engine 205) can perform indexing operations on the plurality of web pages 250, analyzing the various web pages using data mining techniques and creating various indexes stored in memory 208. The memory 208 of the search server 202 may include any memory or database module and may take the form of volatile or non-volatile memory including, without limitation, magnetic media, optical media, random access memory (RAM), read-only memory (ROM), removable media, or any other suitable local or remote memory component. For example, memory 208 may store indexes, classes, applications, backup data, jobs, parameters, cookies, variables, algorithms, instructions, rules, or references thereto.

Illustrated memory 208 includes a web page index 211, a local site name index 214, and a search log 217. Although illustrated within memory 208, some or all of the items may be located external to memory 208 and/or search server 202 in some implementations (e.g., in multiple different memories or multiple different servers, such as additional or alternative indexes stored at one or more servers or systems communicably coupled to the search server 202, as well as any other suitable location). In the present example of system 200, the web page index 211 generally stores information relevant to identifying one or more web pages or web-addressable documents that has been analyzed and indexed by the search engine 205. When the search engine 205 receives search queries from a client 229, the search engine 205 can access the web page index 211 to determine which previously-analyzed web pages 250 best meet the parameters, search terms, and other elements of the search query.

Figure 5A:
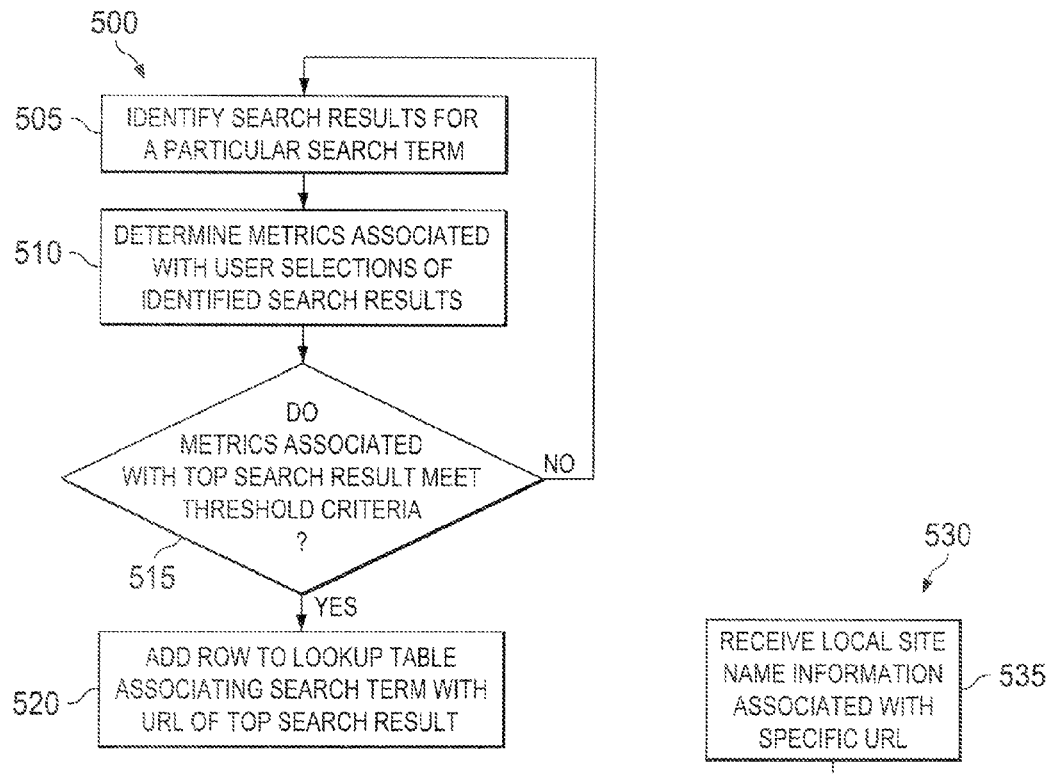
FIG. 5A illustrates a method where the local site name is dynamically determined according to metrics and criteria defined in association with a search engine and the selections made by a plurality of users/searchers in response to the results provided to a plurality of queries.
Figure 5B:
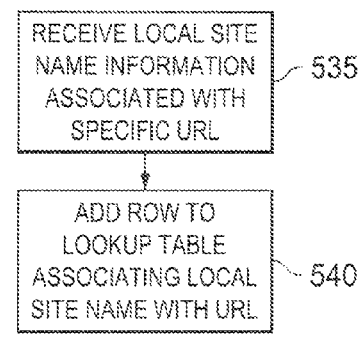
FIG. 5B illustrates a method where the explicit local site name information is provided to a directory service by a user, searcher, site owner, or another individual or entity.
Figure 5C:
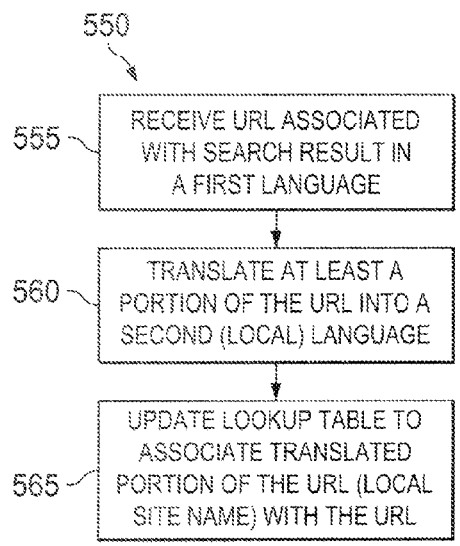
FIG. 5C illustrates a method where the local site name information is generated by translating at least a portion of the URL associated with a particular search result to determine a local site name in a language other than that in which the URL is provided.

Additionally, memory 208 illustrated in FIG. 2 includes a local site name index 214 storing one or more associations between particular host names (or other information uniquely identifying one or more of the analyzed web pages 250) and a particular local site name. In some instances, the local site name index 214 may include one or more lookup tables including a field designating a particular host name or URL (usually provided in a Latin-language alphabet) and a corresponding field including a local site name that provides searchers and users in a language other than that of the host name or URL to be able to understand the source or web site associated with the corresponding host name or URL. As will be illustrated in FIGS. 5A-C, the local site name index 214 can be populated by various different methods. In one example (and as illustrated in FIG. 5A), a search log 217 may be used to analyze the value of one or more metrics associated with searches for particular terms, as well as the search results selected or clicked upon by searches when particular search results were provided by the search engine 205. In some instances, the search log 217 may be a click log created and maintained in association with the search engine 205 in coordination with ongoing improvement and modification in potential search results and analytics. Using the generated metric values and one or more criteria used to evaluate user actions, the search engine 205 or another suitable component may dynamically add or update the lookup table of the local site name index 214 during, after, and in combination with searches from the client 229. In other instances (and as illustrated in FIG. 5B), a directory service may be used to determine the local site name for a particular URL or host name, for instance, by receiving a particular local site name from a web site or host owner or representative explicitly linking the local site name to the URL. Still further (and as illustrated in FIG. 5C), a translation module or operation may be performed on a portion of the URL or host name associated with an identified search result to translate the URL or host name into a local language. That translation may be performed when a search result is identified in response to a query, or when a particular web page or document is initially identified and analyzed by the search engine 205.

When a set of results (i.e., a set of web pages and documents) is identified by the search engine 205 as responsive to a particular query, the search engine 205 accesses the local site name index 214 to determine the particular local site names to be provided with each search result. Once the relevant local site names are selected, the search engine 205 (or another component or sub-module) can insert and update the search result entry associated with at least some of the identified search results. Although illustrated as a single entity, the local site name index 214 may be distributed across a plurality of search servers 202, such as search server 202 associated with searches in a particular language or region. Further, the local site name index 214 may be separated or associated with a plurality of lookup tables, each lookup table being associated with a particular language suitable or associated with the corresponding searcher. For example, the local site name index 214 may be stored as separate indexes for Japanese, Chinese, Korean, and Arabic search requests. Alternatively, the local site name index 214 may include sub-tables associated with one or more of the local languages supported by the search engine 205. When the search engine 205 receives a search query, the search engine 205 may determine which language or region the client 229 or searcher is associated with, and access the appropriate index or lookup table according to that information. In some instances, the search engine 205 may dynamically determine the default language associated with a searcher based on location (via an IP address), search history information associated with a particular searcher (or a corresponding user profile), as well as a specific request from the searcher for a specific language to be used.

The search server 202 includes an interface 223 for communicating with other computer systems, such as other search servers (not illustrated), clients 229, and web pages 250 over network 226. Generally, interface 223 comprises logic encoded in software and/or hardware in a suitable combination operable to communicate with the network 226. More specifically, interface 223 may comprise software supporting one or more communication protocols such that the network 226 or hardware is operable to communicate physical signals.

The network 226 facilitates wireless or wireline communication between the search server 202 and any other local or remote computer, including one or more clients 229 in the system 200. Indeed, while illustrated as a single network, network 226 may be a discontinuous network, so long as at least a portion of the network 226 may facilitate communications between senders and recipients. An example wireless link may be provided via 802.11a/b/g, 802.20, WiMax, or other types of wireless links. The network 226 can encompass any internal or external network, networks, sub-network, or combination thereof operable to facilitate communications between various computing components inside and outside the illustrated system 200. The network 226 may communicate, for example, Internet Protocol (IP) packets, Frame Relay frames, Asynchronous Transfer Mode (ATM) cells, voice, video, data, and other suitable information between network addresses. The network 226 may include one or more local area networks (LANs), radio access networks (RANs), metropolitan area networks (MANs), wide area networks (WANs), all or a portion of the Internet, one or more wireless phone networks, and/or any other communication system or systems at one or more locations.

The illustrated environment of FIG. 2 also includes one or more clients 229. Each client 229 is any computing device operable to connect or communicate at least with the search server 202 and/or the network 226 using a wireline or wireless connection. Further, each client 229 includes a processor 235, an interface 232, a web browser 238, a graphical user interface (GUI) 244, and a memory 241. In general, the client 229 comprises an electronic computing device operable to receive, transmit, process, and store any appropriate data associated with the environment 200 of FIG. 2. It will be understood that there may be any number of clients 229 associated with environment 200, as well as any number of clients 229 external to environment 200. For example, while illustrated environment 200 of FIG. 2 includes only a single client 229, alternative implementations of environment 200 may include two or more clients 229 communicably coupled to the search server 202. There may also be one or more additional clients 229 external to the illustrated portion of environment 200 that are capable of interacting with the environment 200 via the network 226. Further, the term "client" and "user" may be used interchangeably as appropriate without departing from the scope of this disclosure. Moreover, while each client 229 is described in terms of being used by one user, this disclosure contemplates that many users may use one computer or that one user may use multiple computers. As used in this disclosure, client 229 is intended to encompass a personal computer, touch screen terminal, workstation, network computer, kiosk, wireless data port, smart phone, personal data assistant (PDA), one or more processors within these or other devices, or any other suitable processing device. For example, each client 229 may comprise a computer that includes an input device, such as a keypad, touch screen, mouse, or other device that can accept information, and an output device that conveys information associated with the operation of the search server 202 or the client 229, including digital data, visual information, or the GUI 244. Both the input device and the output device may include fixed or removable storage media such as a magnetic computer disk, CD-ROM, or other suitable media to both receive input from and provide output to users of the client 229 through the display, namely, the GUI 244.

The interface 232 of the client 229 may be similar to interface 223 of the search server 202 in that it may comprise logic encoded in software and/or hardware in a suitable combination and operable to communicate with the network 226. More specifically, interface 232 may comprise software supporting one or more communication protocols such that the network 226 or hardware is operable to communicate physical signals to and from the client 229.

Similarly, memory 241 of the client 229 may be similar to memory 208 of the search server 202, and may include any memory or database module and take the form of volatile or non-volatile memory including, without limitation, magnetic media, optical media, random access memory (RAM), read-only memory (ROM), removable media, or any other suitable local or remote memory component. For example, memory 241 may store backup data, parameters, cookies, variables, algorithms, instructions, rules, or references thereto, as well as any other suitable data.

The GUI 244 comprises a graphical user interface operable to allow the user to interface with at least a portion of environment 200 for any suitable purpose, including generating a visual representation of search query results provided to the client 229 by the search engine 205 in response to a query sent from the client 229, as well as to allow users at each client 229 to view those visual representations. Generally, the GUI 244 provides users with an efficient and user-friendly presentation of data provided by or communicated within the system. The term "graphical user interface," or GUI, may be used in the singular or in the plural to describe one or more graphical user interfaces and each of the displays of a particular graphical user interface. Therefore, the GUI 244 can be any graphical user interface, such as a web browser, touch screen, or command line interface (CLI) that processes information in the environment 200 and efficiently presents the results to the user. In general, the GUI 244 may include a plurality of user interface (UI) elements such as interactive fields, pull-down lists, and buttons operable by the user at the client 229. These UI elements may be related to the functions of one or more applications executing at the client 229, such as a business application or the web browser associated with the GUI 244. In particular, the GUI 244 may be used in connection with the web browser 238 associated with the GUI 244 to view and navigate to various web pages, some of which may be associated with (or the visual representation of) the plurality of web pages 250 associated with network 226 and identified by the search engine 205 (as illustrated in FIG. 2). For purposes of the present disclosure, the term "web browser" and "GUI" may be used interchangeably, such that the GUI 244 may be referred to as the "web browser 238."

In some instances, the GUI 244 (or the web browser 238) is a software application which enables the client 229 (or a user thereof) to display and interact with text, images, videos, music, and other multimedia files and information typically located in web page files received from one or more web servers (e.g., search server 202, or information from web servers hosting one or more of the plurality of web pages 250), or other computers accessible via the network 226. Additionally, the GUI 244 (or web browser 238) allows the client 229 to present a search engine web page associated with the search engine 205 that allows the client 229 to submit web search queries, as well as to present the results identified by the search engine 205 associated with those web search queries. Text and images embedded within web pages displayed by the web browser 238 can contain hyperlinks (or other logical network addresses) to other web pages, with some of those web pages associated with different web servers and domains than the web page containing the hyperlink (e.g., the list of hyperlinks to various web pages identified by the search engine 205). Users of client 229 can quickly and easily access information associated with the various web pages by navigating those links using the web browser 238. In general, the web browser 238 formats web pages stored as HTML documents, XHTML documents, text files, or any other suitable files for display via the GUI 244, so the visual appearance of a particular web page 250 may differ between various types of browsers. As illustrated in FIG. 2, the web browser 238 can connect to the search engine 205 and web pages 250 via the network 226. Example web browsers 238 may include Microsoft's Internet Explorer, Mozilla's Firefox, Apple's Safari, Opera Software ASA's Opera browser, and Google's Chrome, as well as any other suitable browser. In certain implementations, the web browser 238 may be associated with, or may be a portion or module of, a business application, providing web browser or similar web page processing and visualization functionality to the application.

While FIG. 2 is described as containing or being associated with a plurality of components, not all components illustrated within the illustrated implementation of FIG. 2 may be utilized in each alternative implementation of the present disclosure. Additionally, one or more of the components described herein may be located external to environment 200, while in other instances, certain components may be included within or as a portion of one or more of the other described components, as well as other components not described. Further, certain components illustrated in FIG. 2 may be combined with other components, as well as used for alternative or additional purposes, in addition to those purposes described herein.

Figure 3:
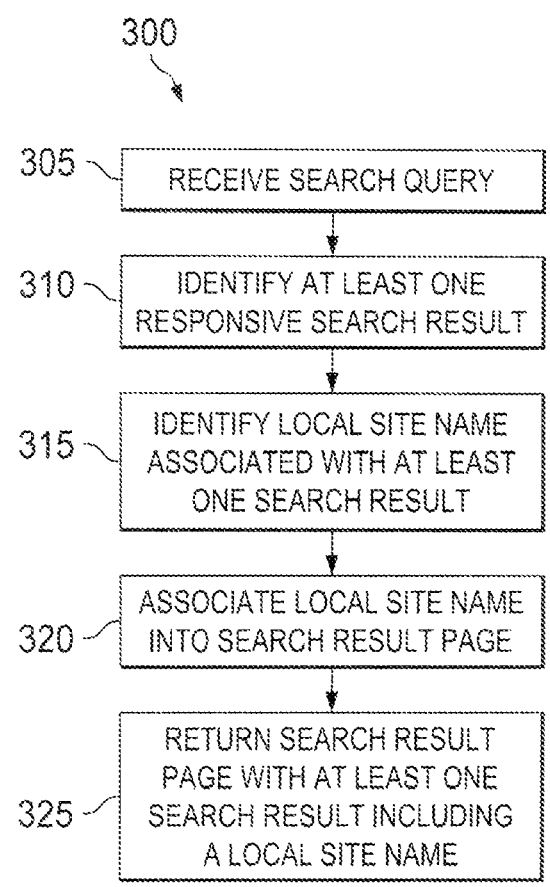
FIG. 3 is a flowchart illustrating a method for retrieving and presenting a search results page with at least one search result being associated with a local site name.

FIG. 3 is a flowchart illustrating a method 300 for retrieving and presenting a search results page with at least one search result being associated with a local site name. For clarity of presentation, the description of method 300 that follows references system 200 of FIG. 2 for example elements that may performed in one or more of the described operations. However, it will be understood that method 300 may be performed, for example, by any other suitable system, environment, or combination of systems and environments, as appropriate. In one implementation, the method 300 may be performed by the search engine 205.

At 305, a search query is received. In some instances, the received search query may be provided by a user or searcher associated with a web-based interface of a search engine. The search query may include one or more search terms defined by the user, and submitted via the Internet to the search engine.

At 310, at least one search result responsive to the received search query is identified. As an example, a search engine may identify one or more results from a search index (such as the web page index 211 illustrated in FIG. 2) to determine the most relevant search results for a particular search term or terms. As described above, each search result may be associated with a URL providing the search result a unique identifier of its location. As part of the URL, a host name or other top-level domain name may be identified. For example, the URL "www.test.com/xyz/abc/tuv" is considered to have a host name of "www.test.com." Thus, while the search result may define a more detailed location or URL, the search engine can recognize that the host name or web site associated with the search result is "www.test.com."

At 315, a local site name associated with the at least one search result is identified. In some instances, the search engine may access a local site name index that provides local site names associated with various URLs or host names. For instance, the host name of "www.test.com" may be associated with a specific local site name, XYZ, where XYZ represents a non-Latin alphabet-based representation or translation of the host name "www.test.com" or a portion thereof (e.g., "test"). Alternatively, the local site name may be a translation of the host name "www.test.com" or "test" from a first language to a second language. Generally, the local site name represents an identifier of the source or web site from which a particular search result is associated or retrieved.

At 320, the identified local site name is associated with the corresponding search result. In some instances, associating the local site name with the search result may comprise inserting the local site name into a search result entry associated with the search result. For instance, the local site name may be inserted just in front of the URL associated with the search result entry. In other instances, the local site name may be included at the beginning of the search result entry, prior to the title or name of the particular web page or document represented by the search result. In still other instances, the search result entry may be associated with the local site name, so that when a user places his or her mouse over the search result entry, a pop-up box or screen displaying or including the local host name identifier is provided. Other suitable associations between the local site name and the search result entry may be included, and the updated search result entry may be included in a search results page to be provided to the searcher or user.

At 325, the search results page is returned to the user with at least one search result entry including or associated with a local site name. As described, providing the local site name allows users fluent in any language to be provided with a clear source or web site identifier listing, in a language local to (or specified by) the user. By doing so, web search results are provided an additional layer of understanding and context, thus allowing for a simpler and quicker review of search results associated with the particular query received at 305.

FIG. 4A is a flowchart illustrating a method 400 for identifying, retrieving, and modifying search results to include one or more local site name entries with a list of search results. Method 400 may be performed, for example, by a system such as the systems 100 and 200, but for clarity of presentation, the description that follows uses system 200 as a particular example for describing the method 400. However, another suitable system or combination of systems may be used to perform method 400 in alternative implementations.

At 405, a search query (or set of search terms) is received. At 410, one or more search results responsive to the search query are received. The operations of 405 and 410 may be similar to the operations 305 and 310 of method 300 illustrated above, as well as any other suitable techniques. At 415, a determination is made as to whether the search results identified at 410 are to be updated or modified by adding (or associating) local site names to the search result entry. The determination of 415 may be based on any number of factors. In one instance, specific user settings may determine whether or not the local site names are to be reviewed and added to the search results. In other instances, the search engine may determine whether the search results are in the same language as the user, and if so, determine that no local site names are necessary. Alternatively, local site names may be added to each set of search results identified in response to a search query.

If method 400 determines that no local site names are to be added to the identified search results, method 400 moves to 460, where in such instances the standard search results page may be returned without including the local site name information. On the other hand, if it is determined that local site name information is to be added to the identified search results, method 400 continues at 420.

At 420, a relevant portion of the URL associated with one of the search results is identified. As previously described, the relevant portion of the search result may generally include the host name included in the URL. In alternative implementations, the relevant portion of the search results may include the entire URL, as well as other portions of the URL capable of being used to identify the source or host of the particular search result. As illustrated in FIG. 2, the search engine 205 may retrieve the relevant portion of the URL from the identified result, although any suitable component or module may be used to extract the relevant portion of the URL.

At 425, a lookup table storing local site names associated with one or more URLs (or portions thereof) is queried to determine the local site name for the identified search result. In some instances, the query of 425 may include a structured query language (SQL) query to a database or other index storing the local site name information, such as the local site name index 214 of FIG. 2. In other instances, particularly where the local site name information is stored in a non-database file, a search for a corresponding portion of the URL may be performed through a text-based search of the relevant local site name index or file. When the URL (or relevant portion thereof) is found in the file, a related item defining or including the local site name is identified. Still further, in some instances no lookup table may be available, and instead the search engine or a related component may translate the relevant portion of the URL into a local language based on a first-to-second language dictionary or other translation service or operation.

At 430, a determination is made whether a local site name was found (or translated) by the operations of 425. No local site name may be identified where a particular local site name has not been identified for the URL (see, e.g., the description accompanying FIG. 5B), where algorithms used to identify a particular local site name cannot or have not yet identified or associated with a particular local site name with the URL (see, e.g., the description accompanying FIG. 5A), or where a translation for the relevant portion of the URL is not available (see, e.g., the description accompanying FIG. 5C). In instances where no local site name is identified, method 400 continues at 435, where a search result entry is prepared for the search result without adding a local site name. In some instances, no additional preparation may be necessary when no local site name information is found. In others, the fact that no local site name was found at 430 may be included with or understandable from the prepared search result of 435, including, but not limited, to an explicit term or symbol meaning that no local site name is available, or by adding coloring, shading, or other stylistic changes to the standard search result. Once the search result entry is prepared, method 400 continues at 450.

On the other hand, if a local site name is found, the local site name is retrieved from the lookup table, local site name index, or other local site name location at 440. Retrieving the local site name from the lookout table may include operations similar to those described at 425, and receiving the returned results associated with the relevant portion of the URL. In some instances, the operation at 440 may instead be the translation operation described in more detail at FIG. 5C, where the relevant portion of the URL is translated into a local language for inclusion in the search result entry. Any appropriate operations necessary or capable of accessing or determining local site name information may be used at 440.

Once the local site name is retrieved or identified, method 400 continues at 445 where an updated search result entry, including the local site name, is prepared. As previously described, preparing the updated search result entry may include appending or inserting the local site name at any place within the search result suitable for review by the user. Additionally, preparing the search result entry may also include associating the entry with a particular local site name such that a mouse-over or other user interaction with the finalized search result may allow a pop-up window or other interactive element to provide the user with a visualization or identity of the appropriate local site name in the user's default or preferred language. Once the updated search result entry is prepared, method 400 continues at 450.

At 450, a determination is made whether additional search results remain. In some instances, each search result may be processed according to operations 420-445 concurrently, while in others, each search result may be individually processed. Additionally, in some instances, some search results may be processed concurrently, while other search results wait for additional processing resources to become available. The determination of 450 relates to the determination of whether any further search results need to be processed according to operations 420-445. If one or more search results remain, method 400 returns to 420 and continues its operations. If no additional search results remain, method 400 continues at 455, where the search results page is updated with the updated search result entries, where some of the search result entries include local site name information. Once the search results page is updated, method 400 continues at 460 where the search results page is returned, for example, to the user or searcher who submitted the search query of 405.

Figure 4B:
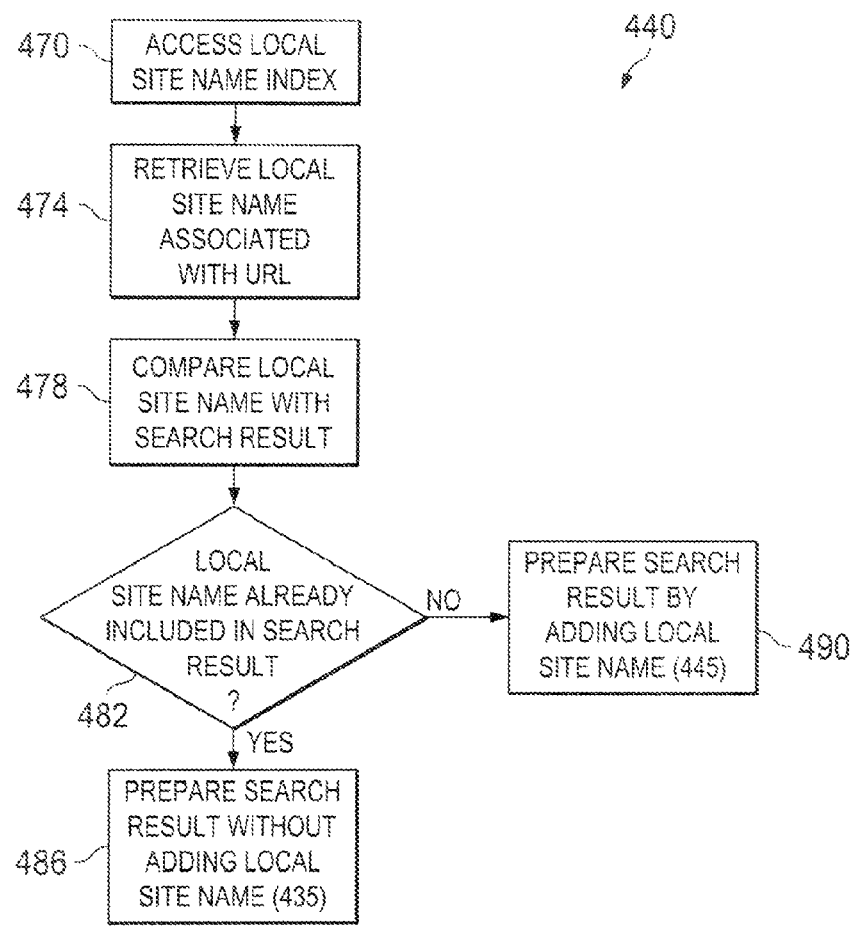
FIG. 4B is a flowchart illustrating an example method for retrieving a local site name from a lookup table for inclusion or insertion within a particular search result entry.

FIG. 4B is a flowchart illustrating an example method 440 for retrieving a local site name from a lookup table for inclusion or insertion within a particular search result entry. The method 440 of FIG. 4B corresponds to operation 440 of FIG. 4A, and represents one possible implementation of that operation. However, such operations may be performed in any number or combination of steps or operations, and a person of skill in the art would understand that the illustrated flowchart of FIG. 4B is merely an example in one example implementation.

At 470, a local site name index or repository is accessed. In some instances, the accessing operation of 470 may be performed by a search engine using a SQL query addressed to the local site name index using at least a portion of the URL associated with a particular search result, as well as any other suitable method for accessing the local site name index. At 474, a local site name associated with the URL (or a portion thereof) for a particular search result is retrieved from the local site name index. In one instance, retrieving the local site name comprises receiving a response to a SQL query or other request to the local site name index, where the response contains information identifying the appropriate local site name.

At 478, the retrieved local site name is compared with the particular search result. In some instances, the page name or title may already include information identifying the local site name, or may otherwise provide the information necessary for a user or searcher to identify, in a language local to the user/searcher, the relevant local site name associated with the search result. Therefore, in order to avoid unnecessarily duplicating the search result, a comparison of the page title (or name), as well as any other portion of the search result, may be performed at 478. At 482, a determination is made whether the retrieved local site name is already included in the search result such that the retrieved local site name does not need to be inserted in the search result. In some implementations, method 440 may include the retrieved local site name in each search result to ensure that the local site name is included therein. In other implementations, the comparison may only be performed in certain instances where a likelihood of confusion regarding the local site name may be present. If it is determined that the retrieved local site name is already included in or part of the search result, method 440 continues at 486, where the search result entry is prepared without adding the retrieved local site name to the search result. In some instances, operation 486 may correspond to operation 435 of FIG. 4A. If, on the other hand, the retrieved local site name is not included in the search result, or the retrieved local site name is to be included regardless of such determination, method 440 continues at 490, where the search result entry is prepared in part by adding the retrieved local site name to the search result. In some instances, operation 490 may correspond to operation 445 of FIG. 4A.

FIGS. 5A-C illustrate three example implementations of methods for adding and/or updating local site name information to a local site index, such as the local site index 214 illustrated in system 200. FIG. 5A illustrates a method 500 where the local site name is dynamically determined according to metric values and criteria defined in association with a search engine and the selections made by a plurality of users/searchers in response to the results provided to a plurality of queries. FIG. 5B illustrates a method 530 where the explicit local site name information is provided to a directory service by a user, searcher, site owner, or another individual or entity. FIG. 5C illustrates a method 550 where the local site name information is generated by translating at least a portion of the URL associated with a particular search result to determine a local site name in a language other than that in which the URL is provided.

Turning first to FIG. 5A, a method 500 of populating a local site index is illustrated. At 505, search results are identified in response to a particular search term or set of search terms. In general, certain search results may commonly be provided in response to certain search terms, such as those generally associated with a local site name. For instance, the search term for "ESPN" will generally provide at least one of the search results with a web page associated with the host name of "www.espn.com." As such, one or more searchers may click on search results wherein the host name or web site associated with a particular web page is associated with the name "ESPN."

At 510, one or more metric values based on or associated with user/searcher selections of identified search results may be determined. For instance, a click log associated with the particular search terms used with 505 may be created or reviewed, for instance, by the search engine or another module capable of or operable to manipulate and manage a local site name index. For example, the metrics and/or click log may include information such as a particular click rate associated with a particular host or web site when a search term is used, a raw number of clicks associated with particular search results returned in response to a particular search term, as well as any other relevant information associated with user/searcher action in response to particular search terms. For example, when "ESPN" is entered as a search term, the click log may reflect that a certain percentage of (or a particular raw number of) users click on a web page or document associated with "www.espn.com." These metrics (and their associated values) may be stored by a search engine, a component thereof, or any other external component capable of storing click- and user-related analytics.

At 515, a determination is made whether the value of the metrics associated with a top search result, such as "ESPN" in the previous example, meet certain threshold criteria required before a search term or search result is officially identified as associated with a particular local site name. In some instances, the threshold criteria may include a minimum number of total clicks associated with a search term, where a certain percentage of those clicks is associated with a specific host name or web site, and wherein the difference in clicks and/or click rate (or percentage) is a specific amount greater than some value determined to be statistically relevant. In other words, if 1000 clicks were recorded for the web site "www.espn.com" in response to the search term "ESPN," and the click rate for the "www.espn.com" is over 35 percentage points higher than the next closest search result, host name, or web site, the threshold criteria may be met. If the threshold criteria are not met, method 500 returns to 505 where a new search term is analyzed, along with the metric values and criteria associated with that search term's respective results. On the other hand, if the threshold criteria are met, method 500 continues to 520.

At 520, a row in a lookup table associating the particular search term with the top search result is added. For example, the search term of "ESPN" may now be considered the local site name of search results associated with "www.espn.com," such that a record in the local site name index may be created or updated to associate the URL "www.espn.com" with the search term, and now local site name, "ESPN." When future searches are performed using, for example, the previously described method 400 of FIG. 4A, search results containing or related to the URL or host name of "www.espn.com" will be supplemented such that the local site name of "ESPN" is added to the search result entry.

As will be understood by one of skill in the art, the description associated with FIG. 5A is merely one example, and may be used or modified in a variety of ways. For instance, although described using the English-based web site of "www.espn.com," any web site or host name could be used instead, including those from non-English-speaking countries, such as Korea, Japan, and China, among others. In those instances, search terms in Korean, Japanese, or Chinese (or any other suitable language) can be measured with the metric values and threshold criteria to associated non-Latin-alphabet local site names with particular URLs and host names. Additionally, any appropriate metrics, metric values, and threshold criteria can be used to create the lookup tables. For example, engineers and other system administrators associated with a search engine and general search environment can determine the specific criteria, as well as the specific metrics, to be used in any implementation.

FIG. 5B illustrates a second method 530 of populating a local site name index or repository where an explicit local site name is provided for a particular URL or host name. At 535, local site name information associated with a specific URL (or a portion thereof) or host name is received. For instance, an owner or associate of a particular business or entity owning or associated with a particular URL may submit the local site name information to a directory service, such as that provided by Yahoo or Google, to explicitly provide information linking or associating a URL with a site name. Referring back to the example of "www.espn.com," a corporate representative or other individual associated with the company of ESPN may submit a local site name associated with the entity's URL, such as the Korean, Japanese, or Chinese translation of the phrase "ESPN." At 540, a row in a lookup table associating the received local site name information with the specifically identified URL or host name may be added (and/or updated). Thus, for example, when future searches are performed using method 400 of FIG. 4A, search results containing or related to the URL or host name of "www.espn.com" may be supplemented with the appropriate local site name associated with the URL/host name.

FIG. 5C illustrates a third method 550 for populating a local site name index or repository, in this case where a portion of the URL, including the host name or primary web site identifier, is translated from the language in which the URL is provided to a second, local language. Although this method 550 may be used primarily in moving from a Latin alphabet-based language to a non-Latin alphabet-based language (e.g., from English to Japanese), method 550 may be used to translate URL (or portion thereof) into any suitable local language, including other Latin alphabet-based languages (e.g., from English to German, or from German to English).

At 555, a URL (in a first language) associated with a search result is received. In some instances, operation 555 may include parsing the URL to identify a relevant portion thereof associated with the host name or web site, and to prepare to translate that portion. At 560, at least a portion of the URL, generally the web site or host name, is translated into a second, or local, language associated with a particular local site name index or a particular user/searcher associated with the present search results. In some instances, the translation may be performed based on a cross-reference to and application of a first-to-second language dictionary (e.g., an English-to-Japanese dictionary, a German-to-English dictionary, etc.). Alternatively, any suitable translation process, software, or methods may be used to perform the translation. At 565, a row in a lookup table may be created or updated to associate the translated portion of the URL (now considered the local site name) with the URL or the portion thereof that was translated at 560. Thus, the translated URL can then be used in future searches according to the method 400 illustrated in FIG. 4A, as well as any other suitable method or operations.

Figure 6:
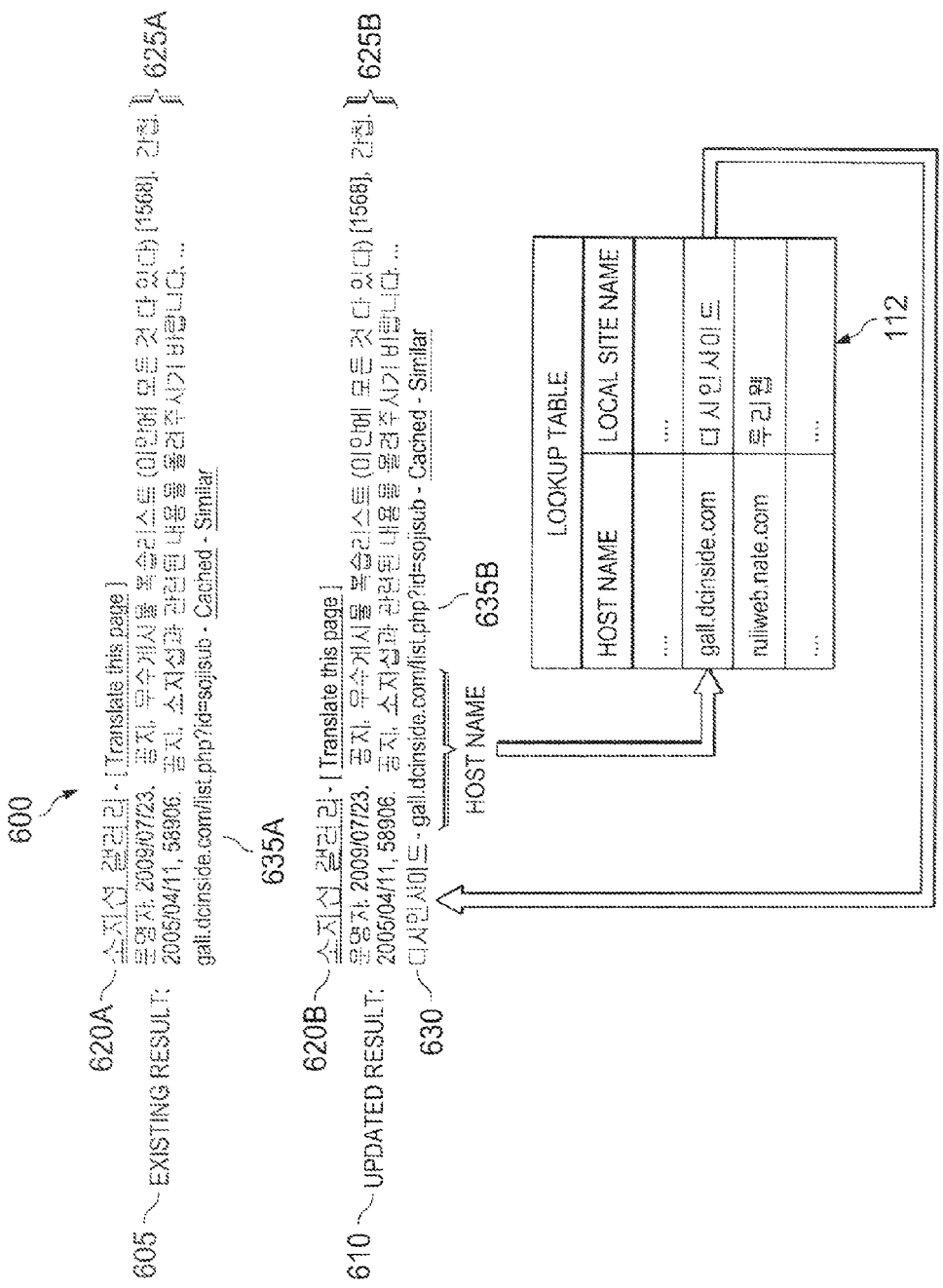
FIG. 6 illustrates examples of a search result entry prior to and after a local site name is included in or with the search result entry.

FIG. 6 illustrates examples 600 of a search result entry prior to and after a local site name is included in or with the search result entry. As illustrated, search result 605 provides an example of an existing search result returned in response to a search associated with a Korean search engine. As illustrated, the existing search result 605 includes a page title or name 620A, a text snippet 625A (a portion of the text from the page including or relevant to the search terms initiating the search), and a URL 635A providing the web address of the existing search result 605. The page name 620A describes the name or title of the particular result, but as illustrated, does not provide a Korean-language representation of the web site or host associated with the search result. Instead, only the URL 635A includes the host name and URL associated with the existing search result.

The updated search result entry 610 illustrates the existing search result 605 after having been updated/modified according to a method for providing a local site name with search results, such as method 400 illustrated in FIG. 4A. The updated search result entry 610 includes the same page title or name 620B, text snippet 625B, and URL 635B, but as illustrated, also includes a local site name 630. Further, FIG. 6 shows that the information defining the local site name 630 is pulled from the lookup table 112 illustrated in FIG. 1, although any relevant lookup table, local site name index, or other suitable repository may be used as well. As illustrated, the host name of "gall.dcinside.com" is matched to the Korean local site name from the lookup table 112 and is inserted into the updated search result entry 610 as local site name 630. By using the updated search result entry 610 (and its local site name 630), users and searchers can quickly view and evaluate a search result based on its associated local site name to determine, among other things, whether the source (i.e., the web site or host name) of the search result is known, respected, and/or worth reviewing. By providing quick access to such information without requiring users/searchers to access the hyperlink or search result, better search results and user interactions can be provided by search engines, particularly by users/searchers limited to non-Latin alphabet-based languages.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a computer readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal, that is generated to encode information for transmission to suitable receiver apparatus for execution by a computer. The computer readable storage device can be a machine-readable storage device, a machine-readable storage substrate, a memory device, or a combination of one or more of them.

The terms "processor" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of any invention or of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of embodiments of the present disclosure have been described. Nevertheless, it will be understood that various modifications may be made without departing from the spirit and scope of the present disclosure. For example, various forms of the flows shown above may be used, with steps added or removed to those illustrated, as well as steps or operations that are performed concurrently with each other or in a different sequential order than that illustrated. Also, although several types of search engine applications have been described, any appropriate search engine application is contemplated in the present disclosure. Accordingly, other implementations are within the scope of the following claims.

What is claimed is:

1. A method comprising:
   receiving a search query;
   obtaining at least one search result responsive to the search query, the at least one search result associated with a uniform resource locator (URL) and a page name;
   retrieving a local site name from a local site name index populated using a click log, the retrieved local site name associated with a host name portion of the URL for the at least one obtained search result, the host name portion being in a first language and the local site name being in a second language that differs from the first language, wherein populating the local site name index using the click log includes:
      generating a value of one or more metrics associated with a set of search results associated with at least one search term;
      determining that the generated value of the one or more metrics associated with at least one of the set of search results exceed a predetermined threshold criteria; and
      creating a local site name by associating at least a portion of the at least one search term with at least a portion of the host name portion of the URL associated with the at least one of the set of search results whose one or more metrics are determined to exceed the predetermined threshold criteria to identify the portion of the at least one search term as the local site name associated with the host name portion of the URL;
      adding the local site name to the local site name index; and
   initiating instructions resulting in return of the at least one search result in a search results page, where the at least one search result includes the URL, a page name associated with the at least one search result, and the local site name associated with the host name portion of the URL of the at least one search result.

2. The method of claim 1, wherein the second language is determined based on one of a location of a client device that submits the search query or a language preference associated with the client device that submits the search query.

3. The method of claim 1, wherein the URL includes a Latin alphabet-based series of characters, and the local site name includes a representation of at least a portion of the URL in a non-Latin alphabet-based language.

4. The method of claim 3, wherein the non-Latin alphabet-based language is selected from a group consisting of Chinese, Japanese, Korean, and Arabic.

5. The method of claim 1, wherein the at least one search result returned to the user in the search results page further includes a text snippet associated with the at least one search result, and further wherein the local site name is located adjacent to the URL associated with the at least one search result.

6. The method of claim 1, wherein the page name is in the first or second language.

7. An article comprising a non-transitory computer-readable storage medium, the computer readable storage medium storing instructions for causing one or more processors to perform operations including:
   obtaining at least one search result responsive to a search query, the at least one search result associated with a uniform resource locator (URL) and a page name;

retrieving a local site name from a local site name index populated using a click log, the retrieved local site name associated with a host name portion of the URL for the at least one obtained search result, the host name portion being in a first language and the local site name being in a second language that differs from the first language, wherein populating the local site name index using the click log includes:

generating a value of one or more metrics associated with a set of search results associated with at least one search term;

determining that the generated value of the one or more metrics associated with at least one of the set of search results exceed a predetermined threshold criteria; and creating a local site name by associating at least a portion of the at least one search term with at least a portion of the host name portion of the URL associated with the at least one of the set of search results whose one or more metrics are determined to exceed the predetermined threshold criteria to identify the portion of the at least one search term as the local site name associated with the host name portion of the URL;

adding the local site name to the local site name index; and generating at least one search result for inclusion in a search results page, where the at least one search result includes the URL, a page name associated with the at least one search result, and the local site name associated with the host name portion of the URL of the at least one search result.

8. The article of claim 7, wherein the second language is determined based on one of a location of a client device that submits the search query or a language preference associated with the client device that submits the search query.

9. The article of claim 7, wherein the URL includes a Latin alphabet-based series of characters and the local site name includes a representation of the host name portion of the URL in a non-Latin alphabet-based language.

10. The article of claim 9, wherein the non-Latin alphabet-based language is selected from a group consisting of Chinese, Japanese, Korean, or Arabic.

11. The article of claim 7, wherein the computer readable storage medium stores instructions for causing one or more processors to perform further operations including sending the generated search results to a search engine for presenting a search results page to a client device, wherein the search results returned to the search engine server include the URL, a page name associated with the at least one search result, the local site name associated with the host name portion of the URL, and a text snippet associated with each of the search results, and further wherein the local site name is located adjacent to the URL associated with the at least one search result.

12. A system comprising:

one or more search engine servers adapted to generate search results associated with a particular search query, each search result associated with a uniform resource locator (URL) and a page name;

one or more local site name servers adapted to retrieve a local site name from a local site name index populated using a click log, the retrieved local site name associated with a host name portion of the URL for at least one of the search results, the host name portion of the URL being in a first language and the local site name being in a second language that differs from the first language, wherein the second language is determined based on a location of a client device that submits the particular search query, and wherein the one or more local site name servers are further adapted to populate the local site name index using the click log, where populating the local site name index using the click log includes:

generating a value of one or more metrics associated with a set of search results associated with at least one search term;

determining that the generated value of the one or more metrics associated with at least one of the set of search results exceed a predetermined threshold criteria; and creating a local site name by associating at least a portion of the at least one search term with at least a portion of the host name portion of the URL associated with the at least one of the set of search results whose one or more metrics are determined to exceed the predetermined threshold criteria to identify the portion of the at least one search term as the local site name associated with the host name portion of the URL;

adding the local site name to the local site name index; and one or more search results servers adapted to return at least one modified search result, where the modified search result includes the URL, a page name associated with the at least one search result, and the local site name associated with the host name portion of the URL of the at least one search result.

13. The system of claim 12, wherein the one or more local site name servers include a local site name index storing local site name information associated with a plurality of URLs.

14. The system of claim 13, wherein the local site name index is populated using a click log.

15. The system of claim 13, wherein the local site name index is populated by associating at least a portion of a URL with a particular local site name based on information retrieved from a directory service.

* * * * *